(No Model.) 2 Sheets—Sheet 1.

G. L. TULLER.
COMBINED PAPER WEIGHT, PEN, PENCIL, OR CIGAR HOLDER.

No. 377,726. Patented Feb. 7, 1888.

WITNESSES
Edwin L. Yewell.
S. J. Van Stavoren

INVENTOR
Geo. L. Tuller
by Geo. R. Byington,
*Attorney*

(No Model.) 2 Sheets—Sheet 2.
G. L. TULLER.
COMBINED PAPER WEIGHT, PEN, PENCIL, OR CIGAR HOLDER.
No. 377,726. Patented Feb. 7, 1888.
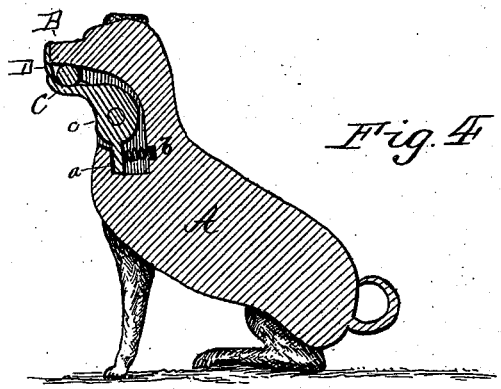
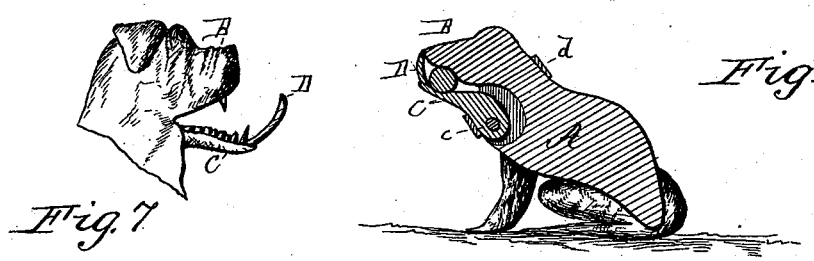
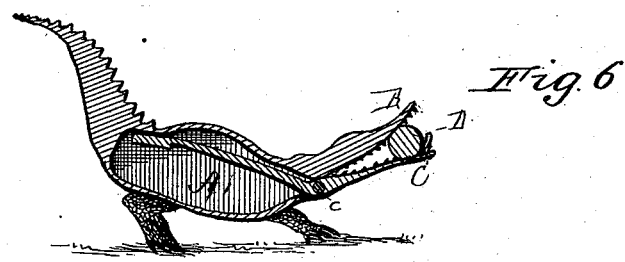
WITNESSES
Edwin I. Yewell
S. J. Van Stavoren
INVENTOR
Geo. L. Tuller
by Geo. R. Byington
*Attorney*

United States Patent Office.

GEORGE L. TULLER, OF NORWALK, CONNECTICUT.

COMBINED PAPER-WEIGHT AND PEN, PENCIL, OR CIGAR HOLDER.

SPECIFICATION forming part of Letters Patent No. 377,726, dated February 7, 1888.

Application filed December 7, 1887. Serial No. 257,210. (No model.)

*To all whom it may concern:*

Be it known that I, GEORGE L. TULLER, a citizen of the United States, residing at Norwalk, in the county of Fairfield and State of Connecticut, have invented certain new and useful Improvements in a Combined Paper-Weight and Pen, Pencil, or Cigar Holder; and I do hereby declare the following to be a full, clear, and exact description of the invention, such as will enable others skilled in the art to which it appertains to make and use the same.

This invention relates to a combined paper-weight and pen, pencil, or cigar holder.

The object of my invention is to construct a paper-weight in the form of an animal or insect having its tongue extended and forming part of the lower jaw and projecting upwardly against the upper jaw to hold the article placed between the jaws, the lower jaw being pivoted at the point of contact with the neck and the two jaws being held together by means of a spring, flexible collar, or weighted lever; and to this end the nature of my invention consists of constructions and combinations, all as will hereinafter be set forth in the specification and particularly pointed out in the claims, reference being had to the accompanying drawings, in which—

Figure 1:
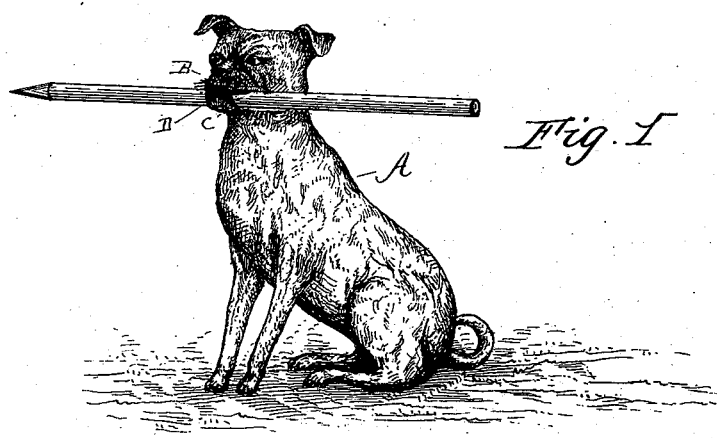
Figure 2:
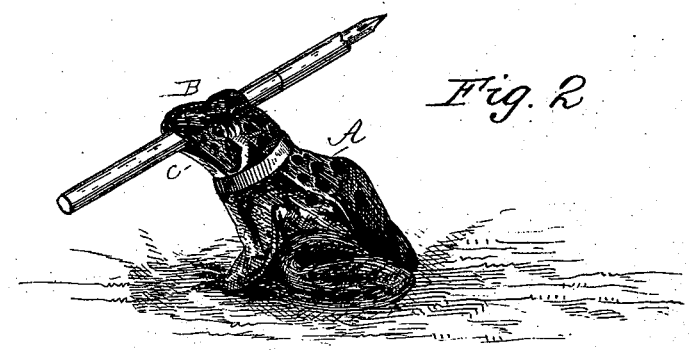
Figure 3:
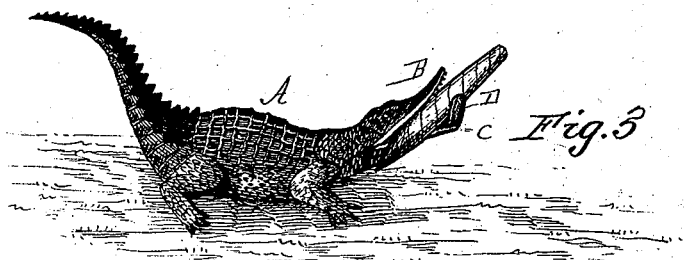

Figures 1, 2, and 3 represent a paper-weight in the form of a dog, frog, or alligator having my device attached thereto. Figs. 4, 5, and 6 represent sections of Figs. 1, 2, and 3; and Fig. 7 is a side view showing the tongue extended and forming part of the lower jaw and projecting upwardly.

A is the body of the paper-weight, which can be in the form of a human being, animal, or insect; B, the upper and C the lower jaw; D, the tongue which forms part of the lower jaw, and extends outwardly and upwardly beyond the end of said lower jaw. The lower jaw, C, is secured to the inside of the body of the weight A at its point of contact with the neck by means of a pivot, c, and is held in place against the upper jaw by means of a spring, flexible collar, or weighted lever.

When a spring is employed, the lower end of jaw C is provided with an extension, a, against which the spring b rests, as shown in Fig. 4; but when a flexible band is used the extension is not required, the band being placed around the outside of the neck in the form of a collar, d, as shown in Fig. 5.

When the weighted lever is employed, the body of the weight is cast hollow and the end of the lower jaw, C, is extended backward into the body and weighted upon its end, as shown in Fig. 6.

Having fully described my invention, what I claim is—

1. As a new article of manufacture, a combined paper-weight and pen, pencil, or cigar holder consisting of a head having an upper and lower jaw, one of which is adapted to be moved by the pen, pencil, or cigar when placed between the jaws and hold said pen, pencil, or cigar in place, substantially as set forth.

2. As a new article of manufacture, a combined paper-weight and pen, pencil, or cigar holder consisting of a head having an upper jaw, a pivoted movable lower jaw provided with a supporting-tongue and adapted to be moved by the pen, pencil, or cigar when placed between the jaws and hold said pen, pencil, or cigar in place, substantially as set forth.

3. As a new article of manufacture, a combined paper-weight and pen, pencil, or cigar holder consisting of a head having an upper jaw, a pivoted movable lower jaw held in place by a spring and adapted to be moved by the pen, pencil, or cigar when placed between the jaws and hold said pen, pencil, or cigar in place, substantially as set forth.

4. As a new article of manufacture, a combined paper-weight and pen, pencil, or cigar holder consisting of a head having an upper jaw, a spring-actuated lower jaw provided with a supporting-tongue, and one of said jaws being adapted to be moved by the pen, pencil, or cigar when placed between the jaws and hold said pen, pencil, or cigar in place, substantially as set forth.

In testimony whereof I affix my signature in presence of two witnesses.

GEO. L. TULLER.

Witnesses:
GEO. R. BYINGTON,
M. F. HALLECK.